(12) United States Patent
Danial

(10) Patent No.: US 12,515,035 B2
(45) Date of Patent: Jan. 6, 2026

(54) UNLOADING BLOOD PUMP SYSTEM AND THE BLOOD PUMP THEREOF

(71) Applicant: ASSISTANCE PUBLIQUE—HOPITAUX DE PARIS, Paris (FR)

(72) Inventor: Pichoy Danial, Maisons-Alfort (FR)

(73) Assignee: ASSISTANCE PUBLIQUE—HOPITAUX DE PARIS, Paris (FR)

( * ) Notice: Subject to any disclaimer, the term of this patent is extended or adjusted under 35 U.S.C. 154(b) by 463 days.

(21) Appl. No.: 18/005,473

(22) PCT Filed: Jul. 15, 2021

(86) PCT No.: PCT/EP2021/069750
§ 371 (c)(1),
(2) Date: Jan. 13, 2023

(87) PCT Pub. No.: WO2022/013349
PCT Pub. Date: Jan. 20, 2022

(65) Prior Publication Data
US 2023/0270993 A1 Aug. 31, 2023

(30) Foreign Application Priority Data
Jul. 16, 2020 (FR) .................................... 2007445

(51) Int. Cl.
*A61M 60/178* (2021.01)
*A61M 60/232* (2021.01)
(Continued)

(52) U.S. Cl.
CPC ........ *A61M 60/178* (2021.01); *A61M 60/232* (2021.01); *A61M 60/422* (2021.01); *A61M 60/82* (2021.01); *A61M 60/857* (2021.01)

(58) Field of Classification Search
None
See application file for complete search history.

(56) References Cited

U.S. PATENT DOCUMENTS

| 6,439,845 B1 | 8/2002 | Veres |
| 2003/0069468 A1 | 4/2003 | Bolling et al. |

(Continued)

FOREIGN PATENT DOCUMENTS

| JP | 6433897 B2 | 12/2018 |
| JP | 2020-512148 A | 4/2020 |

(Continued)

OTHER PUBLICATIONS

International Search Report as issued in International Patent Application No. PCT/EP2021/069750, dated Nov. 8, 2021.

(Continued)

*Primary Examiner* — Mallika D Fairchild
(74) *Attorney, Agent, or Firm* — Pillsbury Winthrop Shaw Pittman LLP

(57) ABSTRACT

An unloading blood pump includes a casing suitable for being incorporated into a human body, a turbine rotated by a rotor, a pumping chamber body mounted in a casing housing the turbine, an inlet port for sucking the blood from a suction cannula to the pumping chamber body and an outlet port for expelling blood from the pumping chamber to a reinjection cannula, wherein the pump is configured, depending on its power supply, to allow a nominal constant continuous flow of between 0.05 L/min and 0.5 L/min in order to reduce a capillary pressure of the lungs and/or of the left atrium and/or of the left ventricle.

11 Claims, 3 Drawing Sheets

(51) Int. Cl.
 A61M 60/422 (2021.01)
 A61M 60/82 (2021.01)
 A61M 60/857 (2021.01)

(56) References Cited

U.S. PATENT DOCUMENTS

| | | | |
|---|---|---|---|
| 2009/0182188 A1* | 7/2009 | Marseille | A61M 60/148 600/16 |
| 2020/0093972 A1 | 3/2020 | Dague et al. | |
| 2020/0246528 A1* | 8/2020 | Mortis | A61M 60/859 |

FOREIGN PATENT DOCUMENTS

| WO | WO 2005/037345 A2 | 4/2005 |
|---|---|---|
| WO | WO 2014/028787 A2 | 2/2014 |

OTHER PUBLICATIONS

Notice of Reasons for Refusal as issued in Japanese Patent Application No. 2023-502648, dated Nov. 20, 2024.

* cited by examiner

[Fig. 1]
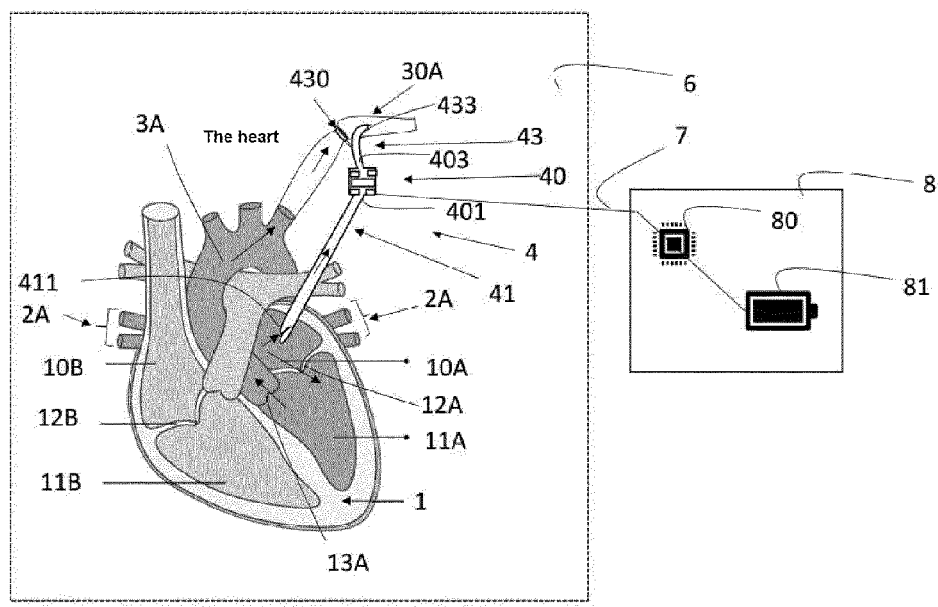

[Fig. 2]
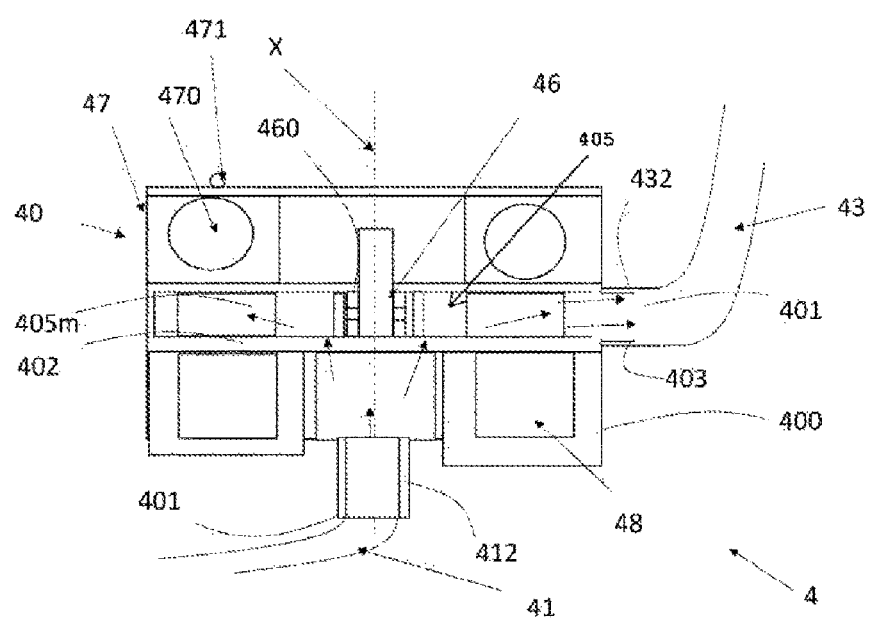

[Fig. 3]
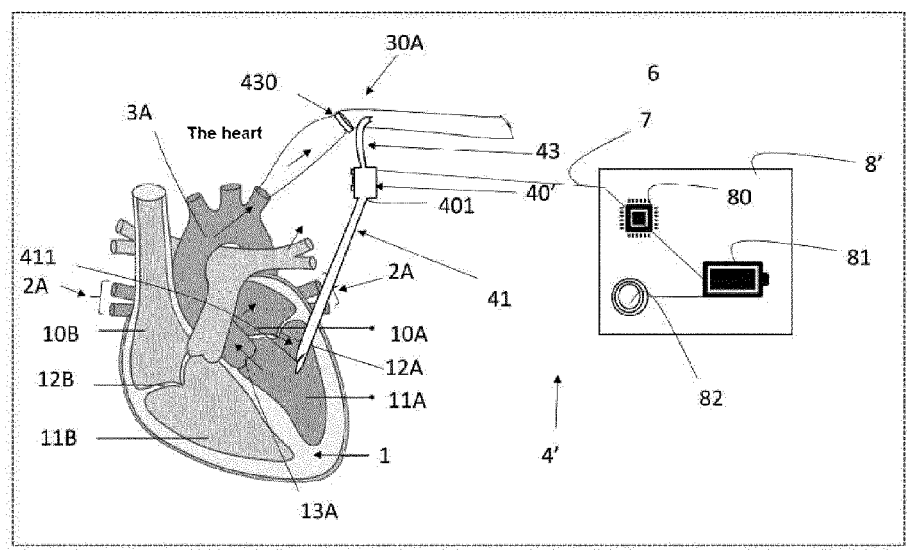

UNLOADING BLOOD PUMP SYSTEM AND THE BLOOD PUMP THEREOF

CROSS-REFERENCE TO RELATED APPLICATIONS

This application is the U.S. National Stage of PCT/EP2021/069750, filed Jul. 15, 2021, which in turn claims priority to French patent application number 2007445, filed Jul. 16, 2020. The content of these applications are incorporated herein by reference in their entireties.

TECHNICAL FIELD OF THE INVENTION

The technical field of the invention relates generally to the field of blood pumps. More precisely, the invention relates to a blood pump, adapted to implantation in humans and for unloading a heart chamber to decrease the risk of heart failure (HF) with preserved ejection fraction (HFpEF).

The present invention also relates to a blood pump system for unloading a zone of a heart for reducing heart failure (HF) with preserved ejection fraction (HFpEF) and the blood pump thereof.

TECHNOLOGICAL BACKGROUND OF THE INVENTION

It is known as a disease that heart failure (HF) can be with preserved ejection fraction (HFpEF) or with reduced or decreased ejection fraction (HFrEF). The distinction between heart failure with reduced or decreased ejection fraction (HFrEF) and heart failure with preserved ejection fraction (HFpEF) is based especially on Doppler echocardiography, which gives a numerical value for the left ventricular ejection fraction (LVEF). An ejection fraction EF<40-50% indicates HF with reduced or decreased ejection fraction (HFrEF). Otherwise, an EF>40-50% is suggestive of heart failure with preserved ejection fraction (HFpEF). Specific criteria for relaxation disorder and diastolic dysfunction can confirm the diagnosis.

Pharmacological and non-pharmacological treatments or surgical treatments with intracardiac devices (bi-ventricular pacing) for heart failure are known, but also ventricular assist devices for the most important cases of heart failure with reduced or decreased ejection fraction (HFrEF). Ventricular assist devices comprise a pump for assisting the heart by pumping blood at a flow rate according to the heart's needs, the useful nominal flow rate of which for an adult is approximately 5 L/min at rest and during exercise can rise to 35-40 L/min in athletes. These pumps can assist the heart between 2 L and 10 L/min when the heart does not make it possible to have a sufficient cardiac output. These pumps are quite large because of the power required to pump the blood flow rate from the left ventricle to the aorta.

Rotary blood pumps can be centrifugal or axial. In a centrifugal blood pump, blood enters the pump along its axis of rotation and exits the pump perpendicular to the axis of rotation. In an axial blood pump, blood enters the pump along its axis of rotation and exits the pump along the axis of rotation.

In particular, there are axial assist pumps that have a very high rotational speed, for example the rotor of which rotates at 32,000 rpm to provide a flow rate of 2.5 L/min. This high speed can lead to blood thrombosis. Even though such a pump can be set for a lower flow rate, for example 0.3 L/min, its rotational speed will be very high, in the order of 17,000 rpm, and may lead to significant risks of haemolysis and thrombosis.

Axial pumps are less cumbersome than centrifugal pumps at iso flow rate, but the centrifugal pump allows a higher flow rate at iso rotational speed, thereby reducing problems of thrombosis and haemolysis.

However, despite numerous trials, no treatment, neither pharmacological nor surgical, has proved effective in heart failure with preserved ejection fraction (HFpEF). As a result, heart failure with preserved ejection fraction leads to many deaths, in France 30 to 50% of cases of heart failure HF are heart failure with preserved ejection fraction (HFpEF) leading, according to an American study, to a mortality rate of about 29% at 1 year and about 65% at 5 years.

There is therefore a need for a treatment for heart failure with preserved ejection fraction (HFpEF).

SUMMARY OF THE INVENTION

The invention offers a solution to the previously discussed problems by making it possible to reduce atrio-pulmonary pressure without increasing pulmonary flow rate relative to the creation of an inter-atrial. Indeed, the pulmonary impact of HFpEF is directly related to the increase in pressure and the passive dilation of the pulmonary vessels. Any increase in pressure leads to an increase in pulmonary artery diameter resulting in a decrease in endothelial shear with detrimental effects on endothelial function. If the pressure stimulus persists, functional and structural remodelling takes place in the pulmonary arterial circulation leading to pulmonary hypertension and thus right heart failure. Thus, by decreasing pulmonary capillary pressure, the symptoms of heart failure with preserved ejection fraction (HFpEF) are reduced.

One aspect of the invention relates to an unloading blood pump system comprising:
  a suction cannula comprising a suction inlet configured to connect to an atrium or ventricle and an outlet end,
  a flux reinjection cannula comprising an inlet end and a reflux end connected to the aorta or an artery downstream of the aorta especially, a, for example left, subclavian artery,
  an unloading blood pump comprising:
    a pumping chamber body allowing the pumping of blood when activated,
    an inlet port connected to the outlet end of the suction cannula, for sucking blood from the suction cannula into the pumping chamber body and
    an outlet port connected to the inlet end of the flux reinjection cannula for expelling blood from the pumping chamber to a reinjection cannula,
    the pump being configured, depending on its power supply, to allow a nominal constant continuous flow rate of between 0.05 L/min and 0.5 L/min in order to reduce a capillary pressure of the lungs and/or of the left atrium and/or the left ventricle,
  a ligation clip configured to ligate the subclavian artery upstream relative to the reflux end of the reinjection cannula.

By means of the invention, the pump can pump blood to decrease the pressure of the left atrium or/and the left ventricle by unloading through the pump blood circulating in the left atrium, that is, a part of the blood coming from the pulmonary veins goes to an artery without passing through the aortic valve. Especially in the case where blood is taken by being sucked by the pump from the left atrium, this blood taken passes from the left atrium to an artery downstream of the aorta without passing through the mitral valve, the left ventricle and the aortic valve. The low constant continuous flow rate, for example 0.5 L/min, allows blood to be unloaded into the left part of the heart to reduce atrio-pulmonary pressure without increasing cardiac output as much as an assist pump. Indeed, the pressure in the left atrium at rest in HFpEF is between 20 and 30 mmHg, thus when using the pump, it is set to a rotational speed to obtain the desired (calculated) constant flow rate to decrease the patient's atrio-pulmonary pressure as required. Such an unloading of blood into the left atrium or left ventricle allows the capillary pressure or in the left ventricle or left atrium to be reduced. For example, clinical and ultrasound parameters can then be used to determine whether the pump's continuous flow rate is sufficient to unload the heart sufficiently or excessively. For example, the pump is rotated to discharge 0.05 L/m at 2000 rpm for example, if the pressure in the heart is still too high (left ventricular end-diastolic pressure), the rotational speed as well as the flow rate can be increased until the desired pressure is achieved, and vice versa. Furthermore, such a pump is much less powerful than the assist pumps and is therefore much less bulky and further requires less energy. Indeed, the lower the flow rate, the less powerful the pump and the smaller its size as well as its energy consumption, for example electricity. This makes it possible, for example, in the case of electric energy consumption, to have a battery storage means or to have a power supply cable (pneumatic or electric) that is smaller than that of the pumps of prior art, thus reducing the risks of infection. Furthermore, the fact that the flow rate is continuous (without acceleration and deceleration) reduces wear and tear and increases energy efficiency. Another advantage is that the cross-section of the inlet and outlet of the pump part connected to the cannulas can be smaller due to the lower flow rate than with power-assisted pumps. Such a pump thus does not need to be oversized compared to that of prior art which is dimensioned to produce a flow rate of at least 2 L/min. The clip allows ligation in order to avoid any flux competition with the heart and to allow the heart to be unloaded. Indeed, the clip for example ligates 90% of the artery upstream of the outlet port to avoid a risk of thrombosis and thrombo-embolic events. This avoids thromboembolic events due to possible flux competition between the heart's output at the subclavian artery and the flow rate of the unloading blood pump. Thus, clipping the subclavian artery upstream of the implantation zone of the reinjection cannula avoids these flux competitions.

In addition to the characteristics just mentioned in the preceding paragraphs, according to one aspect of the invention, the unloading blood pump system may have one or more of the following additional characteristics, considered individually or in any technically possible combination:

According to one embodiment, the pump comprises a casing adapted to be incorporated into a human body.

In the field of intracorporeal implantation, such a pump can be about the size of a pacemaker which not only reduces the discomfort of a patient but also greatly reduces the size of the energy battery (pneumatic or electric) which can be more easily portable. Finally, the lower the power consumption (electric or pneumatic) the smaller the cross-section of the power supply cables (electric or pneumatic) of the motor part of the pump can be.

According to one embodiment, the rotor is configured to rotate at a continuous speed between 2000 and 5000 revolutions per minute and especially between 2000 revolutions per minute for a flow rate of 0.05 L/min and 5000 revolutions per minute for a flow rate of 0.5 L/min. Such a pump meets the needs of a majority of patients and allows the pump to be implemented on a large scale. Thus, such a pump can be even smaller.

According to one embodiment, the pump comprises a maximum flow rate of 0.7 L/min. Such an unloading pump will therefore have a much smaller size, power and consumption than an assist pump.

According to one embodiment, the unloading blood pump comprises:
  a casing adapted to be incorporated into a human body,
  at least one stator integral with the casing comprising winding coils,
  a rotor mounted centrally and rotatably movable relative to the stator, a turbine rotated by the rotor,
  an electric power connector electrically connected to the winding coils,
  the pumping chamber body being mounted in the casing housing the turbine,
  wherein the inlet port allows blood to be sucked from the suction cannula into the pumping chamber body when the rotor rotates the turbine and the outlet port allows blood to be expelled from the pumping chamber to the reinjection cannula.

According to one example of this embodiment, the pump is a centrifugal pump. This reduces haemolysis compared to an axial pump and reduces wear and tear of the pump. In addition, axial pumps cause more thromboembolic events than centrifugal pumps.

According to one example of this embodiment, the rotor is a magnet rotor and the stator comprises an electrically powered winding. Such a rotor avoids the need for bulky and non-permanent brushes as opposed to magnets.

According to one example of this embodiment, the pump part is directly coupled to the rotor shaft. By directly coupled it is meant that one revolution of the rotor is equal to one revolution of the pump part.

According to one example of this embodiment, the rotor forms a centrifugal pump rotor turbine housed in the body of the pumping chamber for pumping blood at a flow rate of between 0.05 L/min and 0.5 L/min. The rotor turbine, also known as an impeller enables, when rotated, the flux of liquid, in this case blood, to be sucked and ejected into the body of the pumping chamber, which ejects this liquid through the outlet port.

For example, the rotor comprises:
  an axial port opposite to the inlet port located axially with respect to the axis of rotation of the rotor,
  magnets evenly angularly distributed around the axial port, notches each located between two magnets, each notch extending longitudinally opening from the inlet port to an outer periphery of the rotor and having an inclined ramp increasing the axial depth of the notch from the inlet port to the outer periphery of the rotor, and in that each notch is open to the volume of the pumping chamber surrounding at least the notches of the rotor,
  and the rotor forming the rotating impeller located in the body of the pumping chamber is adapted to pressurize blood entering through the inlet port axially and exiting through the outlet port radially via the volute.

According to one example of this embodiment, the pump comprises a drive portion comprising several magnetic motor stators and the rotor has several magnetic regions and is axially and radially rotatably levitated by magnetic forces created by passive and active sources of magnetic flux acting on the rotor and one or more hydrodynamic thrust bearings provided on an upper surface of the impeller.

According to one example of this embodiment, the pump is a levitation centrifugal pump comprising a passive permanent magnet bearing. For example, the passive permanent magnet bearing comprises a stack of magnets centred on the axis attached to the stator, stacked with alternating North-South polarity and another stack of magnets attached to the rotor, surrounding the first stack of the stator to together exert a first axial force on the rotor. Such a bearing reduces friction and reduces the size of a levitation bearing.

According to one example of this embodiment, the pump comprises a battery electrically connected to the drive part. This allows the pump to operate without being permanently connected to an external power supply.

For example, the pump comprises a wireless, inductive type charger for charging the battery. Such a pump avoids having power supply cables passing through the skin connected to a battery or charger. According to this example, the pump comprises a control unit for controlling the power supply to the drive part, especially the stator. Such a pump avoids the problem of infection of the power supply cable outlets passing through the skin. Because of its low power consumption, such a pump avoids the need for power supply cables passing through the skin, which can lead to infections.

According to an alternative of the preceding example of embodiment, the pump comprises a power supply cable connected to the connector, the cable being adapted to pass through an intercostal space, or through the abdominal wall, or retro-auricularly.

According to one example of this embodiment, the pump is magnetically and hydromechanically suspended.

According to one example of this embodiment, the pump casing has a size between 3 cm and 5 cm in diameter and between 1.5 cm and 4 cm in axial length, in particular 4 cm (diameter)×3 cm (axial length). Such a pump size allows it to be implanted in the infraclavicular region for example on or under the pectoralis major muscle, in a pocket made in the infraclavicular region. Thus, such a pump will have a casing with an outer diameter smaller than a centrifugal rotor diameter of an assist pump which is about 65 mm with an axial length of 45 mm. In addition, such an unloading pump is much smaller than an assist pump.

According to one embodiment, the pump is a positive displacement pump, also called a volumetric pump, wherein for example the turbine comprises two lobes for blood displacement.

According to one example, the positive displacement pump is a pneumatic or electric pump.

According to one embodiment, the suction cannula comprises at least a part of polyethylene terephthalate in textile form (PET) or polytetrafluoroethylene in microporous form (ePTFE) comprising the proximal port or of another biocompatible material.

According to one example of this embodiment, the suction cannula comprises a treated biocompatible titanium part comprising the suction end and the ePTFE or PET part connects the titanium part to the inlet port of the pump part.

According to one embodiment, the reinjection cannula comprises at least one part of PET or ePTFE or other biocompatible material comprising the proximal port.

According to one example of this embodiment the reinjection cannula comprises a treated biocompatible titanium part comprising the inlet end and the PTFE part connects the titanium part to the outlet port of the pump part.

According to one embodiment, the reinjection cannula and the suction cannula have a diameter of between 5 mm and 10 mm.

According to one embodiment, the clip extends from a part of the reinjection cannula close to the outlet port. This allows the clip to be close to the cannula during surgery and thus assist the surgeon during surgery.

According to one embodiment, the pump is an electrically powered pump and the system comprises a control and power supply device comprising a battery and a control unit for controlling the electric power supply to the pump at a predefined continuous flow rate.

According to one embodiment, the control unit is intended to control the pump continuously (without interruption). This avoids the risk of thrombosis and thromboembolic events. In the event of a low battery charge, the system may comprise a warning device, for example an audible or visual warning device, controlled by the control unit according to the battery voltage measured by the control unit, to warn the user.

According to one embodiment, the system comprises a power supply cable connected to a connector of the pump and to the control unit, the power supply cable being configured to pass through the skin of a human body.

According to one embodiment, the casing comprises a shell that extends in the same matter from a portion of the reinjection cannula and of the suction cannula.

Another aspect of the invention relates to a method for implanting an unloading blood pump system (for example that according to the aspect of the invention previously described with or without the various characteristics of the embodiments previously mentioned), the method comprising:
  either a first step of clamping the left atrium and then a step of anastomosing the suction end of the suction cannula directly to the left atrium and then a step of removing the clamping from the left atrium, or a step of putting the left ventricle under ventricular fibrillation and then a step of anastomosing the suction end of the suction cannula into the tip of the left ventricle under ventricular fibrillation,
  a step of degassing the unloading pump,
  a step of ligating, for example by clipping, the subclavian artery to ligate between 85 and 100% of the artery.
  a clamping step in two zones of the subclavian artery,
  a step of anastomosing the reinjection cannula by inserting its reflux end between the two clamps and downstream of the clipping,
  a step of removing the clamping from the subclavian artery, a step of calculating the flow rate to be unloaded from the blood of a left atrium to avoid a HFpEF,
  a step of setting the control unit of the pump according to the calculated flow rate,
  a step of starting the pump by the control unit.

Another aspect of the invention relates to a method for implanting an unloading blood pump system (for example that according to the aspect of the invention previously described with or without the various characteristics of the embodiments previously mentioned), the method comprising:
  a step of inserting the suction end of the suction cannula into the left atrium, by inserting the suction cannula endovascularly firstly through the internal jugular vein, then the right atrium and finally through the inter-atrial septum to enter in the left atrium,
  a step of degassing the unloading pump, a step of ligating, for example by clipping, the subclavian artery to ligate between 85 and 100% of the artery.

a clamping step in two zones of the subclavian artery, a step of anastomosing the reinjection cannula by inserting its reflux end between the two clamps and downstream of the clipping, a step of removing the clamping from the subclavian artery, a step of calculating the flow rate to be unloaded from the blood of a left atrium to avoid a HFpEF, a step of setting the control unit of the pump according to the calculated flow rate, a step of starting the pump by the control unit.

Another aspect of the invention not claimed relates to an unloading blood pump comprising:

a casing adapted to be incorporated into a human body, at least one stator integral with the casing comprising winding coils, a rotor mounted centrally and rotatably movable relative to the stator, a turbine rotated by the rotor, an electric power connector electrically connected to the winding coils, a pumping chamber body mounted in the casing housing the turbine, an inlet port for sucking blood from a suction cannula to the pumping chamber body when the rotor rotates the turbine and an outlet port for expelling blood from the pumping chamber to a reinjection cannula, characterised in that the pump is configured to, depending on its power supply, allow a nominal constant continuous flow rate of between 0.05 L/min and 0.5 L/min in order to reduce a capillary pressure of the lungs, and/or of the left atrium and/or of the left ventricle.

The pump may comprise the characteristics described in the examples of the embodiment of the pump system according to the previously described aspect of the invention comprising such a blood pump.

Another aspect of the invention not claimed relates to an unloading blood pump comprising:

a casing adapted to be incorporated into a human body, a membrane, a pneumatic power connector for moving the membrane, a pumping chamber body mounted in the casing housing the membrane, an inlet port for sucking blood from a suction cannula to the pumping chamber body when the rotor rotates the turbine and an outlet port for expelling blood from the pumping chamber to a reinjection cannula, characterised in that the pump is configured to allow, depending on its power supply, a nominal constant continuous flow rate of between 0.05 L/min and 0.5 L/min in order to reduce a capillary pressure of the lungs, and/or of the left atrium and/or of the left ventricle.

The invention and its various applications will be better understood upon reading the following description and examining the accompanying figures.

BRIEF DESCRIPTION OF THE FIGURES

The figures are set forth by way of indication and in no way limiting purposes of the invention.

FIG. 1 represents a schematic diagram of an unloading blood pump system according to the invention implanted to reduce a capillary pressure according to a first use, FIG. 2 represents a schematic diagram of an unloading blood pump system according to a first embodiment of the invention.

FIG. 3 represents a schematic diagram of an unloading blood pump system according to the invention implanted to reduce a capillary pressure according to a second use.

DETAILED DESCRIPTION

The figures are set forth by way of indicating and in no way limiting purposes of the invention.

By continuous flow rate, it is meant a flow rate through the pump + or −10% of its flow rate.

FIG. 1 shows a schematic diagram of an unloading blood pump system according to the invention implanted to reduce a capillary pressure according to a first use.

The patient comprises a heart 1 comprising a left part A and a right part B. Blood vessels 2A supply blood to the left part of the heart which sucks it and discharges the blood into an aorta 3A. The left part A comprises a left atrium 10A, a left ventricle 11A, a left atrioventricular valve also called mitral valve 12A between the left atrium 10A and the left ventricle 11A, and an aortic valve 13A between the left ventricle 11A and the aorta 3A. The aorta 3A distributes blood to various arteries including the left subclavian artery 30A. The right part B also comprises a right atrium 10B, a right ventricle 11 B, a right atrioventricular valve also called tricuspid valve 12B between the right atrium 10B and the right ventricle 11 B. Arrows represent the circulation of blood 3A into the heart 1 from the blood vessels 2A first through the left atrium 10A, then through the atrioventricular valve 12A into the left ventricle 11A and finally into the aorta 3A through the aortic valve 13A.

The unloading blood pump system 4 is mounted in this first use to unload blood from the left atrium 10A to the left subclavian artery 30A.

The unloading blood pump system 4 comprises a suction cannula 41, a reinjection cannula 43 and an unloading blood pump 40 and in this example of this embodiment a ligation member, in this case a clip 430 which may be replaced by a lasso. The blood pump 40 comprises an inlet port 401, connected to an outlet end 412 (referenced in FIG. 2) of the suction cannula 41 and an outlet port 403 connected to an inlet end 432 (referenced in FIG. 2) of the reinjection cannula 43. The suction cannula 41 comprises a suction end 411, opposite to the outlet end 412, which in this example is located in the left atrium 11A and the reinjection cannula 43 comprises a reflux end 433 opposite to the inlet end 434 located in this example in the left subclavian artery. The clip 430 is clipped onto the left subclavian artery upstream of the reflux end 433, to ligate the artery. In the example of a lasso, the lasso is wound around the left subclavian artery upstream of the reflux end 433. The clip 430 or lasso may be adapted to ligate between 85% and 100% of a left subclavian artery. The clip 430 or lasso is in this case connected to the reinjection cannula 43 thus improving the surgical procedure. The reinjection cannula 43 and the suction cannula 41 each have an inner diameter between 5 mm and 10 mm, for example 5 mm for the suction cannula 41 and 8 mm for the reinjection cannula 43. The cannulas 41, 43 are made of polyethylene terephthalate in textile form (PET) or polytetrafluoroethylene in microporous form (ePTFE) or of another biocompatible material.

The unloading blood pump 40 thus allows blood to be sucked into the left atrium 10A through the suction end 411 of the suction cannula 41 and unloaded into the subclavian artery 30A through the reflux end 433 of the reinjection cannula 43. The unloading blood pump 40 is configured to absorb a blood flow rate between 0.05 litres per minute and 0.5 litres per minute. This flow rate thus allows the pressure in the left atrium and therefore also the capillary pressure of the lungs to be unloaded.

FIG. 2 represents a schematic diagram of the unloading blood pump 40 connected to the outlet end 412 of the suction cannula 41 and to the inlet end 432 of the delivery cannula 43.

The unloading blood pump 40 comprises a casing 400 adapted to be incorporated into a human body 6 in which a sealed volute-shaped pumping chamber body 402 is located.

The pumping chamber body 402 comprises, in this example, a volume of 4 to 10 millilitres and is open to the inlet port 401 having an inner diameter in this example greater than that of the outlet end 412 of the suction cannula 41, for example a diameter of 1 mm larger than that of the outlet end 412, that is in this example 6 mm. The pumping chamber body 402 is furthermore open at one end of the volute shape to the outlet port 403 having an inner diameter, in this example, 1 mm larger than that of the reinjection cannula 43, that is in this example 9 mm. The pumping chamber body 402 is in this case made of biocompatible titanium.

The unloading blood pump 40 comprises a turbine impeller housed in the pumping chamber body 402.

The unloading blood pump 40 comprises an electric motor forming the driving part of the unloading blood pump 40. In this case, the unloading blood pump 40 is an electric centrifugal pump. In particular, the turbine impeller is also the rotor of the electric motor having an axis of rotation X.

The turbine impeller is thus in this example a rotor turbine 405 comprising a turbine body and ferromagnetic permanent magnets 405m housed in the body. The magnets may for example be made of neodymium or Alnico alloy or cobalt platinum alloy. Furthermore, the rotor turbine 405 comprises for example a polymer layer (Parylene and silicone), for example a polymer overmoulding on the magnets. The layer may furthermore be biocompatible treated with chromium nitride or/and titanium nitride. The turbine impeller 405 may thus comprise, for example, four magnets angularly distributed in four housings of the body about the axis of rotation X, and are positioned with their polarities angularly alternating. The rotor turbine comprises notches each located between two magnets, each notch extending longitudinally opening from the inlet port 412 onto an outer periphery of the rotor turbine. The notch may comprise an inclined ramp increasing the axial depth of the notch from the inlet port to the outer periphery of the rotor, and in that each notch is open to the volume of the pumping chamber surrounding at least the notches of the rotor turbine. Arrows in the figure thus represent the flow rate of blood through the rotor turbine.

The body of the rotor turbine 405, in this example, has an outer diameter between 15 and 30 millimetres with an axial length, also called axial height, between 5 and 20 millimetres and the casing 400 in this example has a size of about 40×30 mm to house the stators(s) of the electric motor therein in addition to the pump chamber body. Due to the low flow rate, the unloading blood pump 40 is thus much smaller than an assist pump of prior art and additionally comprises a diameter of between 30 mm and 50 mm and an axial length of between 15 mm and 40 mm, for example in this example: 40 mm diameter and 30 mm axial length.

The turbine body is made of biocompatible titanium, for example titanium nitride, or of ceramic material.

Thus, such a pumping chamber body 402 with such a rotor turbine 405 can enable the pump to deliver between 0.05 L/min and 0.5 L/min of blood while rotating at a rotational speed between 2000 and 5000 rpm.

The electric motor of the unloading blood pump 40 comprises one or more stators housed in the casing, at least one wound stator 47 of which comprising winding coils 470 producing a magnetic field when supplied with electric power to produce a rotation torque with the rotor turbine 405. The or the other stator may comprise permanent magnets. The unloading blood pump 40 further comprises a power supply connector 471 electrically connected to the winding coils 470 and the system further comprises a power supply cable 7 connected to the connector 471 of the pump and to a control and power supply device 8. The connector 471 may comprise an electric connector of conductive material such as platinum or copper and is covered with an insulator such as PolyEtherEtherKeton (PEEK) or Polysulfone (PSU) or a medical grade epoxy.

In this example, the control and power supply device 8 is extracorporeal. The power supply cable 7 is therefore configured to pass through the skin of a human body 6, in particular here, to pass through an intercostal space or through the abdominal wall or retro-auricularly. The power supply cable 7 may also be made of platinum and be covered with a medical insulator such as that of the cannulas or connector 471.

The control and power supply device 8 comprises a control unit 80 for controlling the power transmitted to the pump motor and thus its rotational speed and flow rate of the blood pump. The control and power supply device 8 further comprises a battery 81 supplying power to the winding coils 470 of the stator 47 of the blood pump 40.

In this example, the electric motor comprises two stators, a first lower stator 48 surrounding the inlet port comprising magnets 480, for example four evenly (regularly) distributed about the axis of rotation and the other upper wound stator 47 axially opposite to the lower stator with respect to the rotor turbine 405. The coiled stator 47 is axially closer than the lower stator 48 thus exerting a greater axial force. Both stators comprise a diameter of 15 mm with a height of 8 mm.

In particular in this example, the unloading blood pump 40 is an electric levitation centrifugal pump comprising a passive permanent magnet bearing 46. The levitation bearing 46 comprises an axis extending from the upper stator 47 axially into the pump chamber body 402 and comprises a plurality of inner permanent magnets 460 integral with the axis, for example 3 magnets, stacked axially with their two identically repeated poles NS/NS/NS. The levitation bearing further comprises a plurality of hollow cylindrical outer permanent magnets 461 mounted to the body of the rotor turbine 405 and stacked axially with their two identically repeated poles NS/NS/NS surrounding the inner permanent magnets 460. This levitation bearing allows the radial pump to be centred repulsively with the magnets and furthermore through the axial attraction of the upper stator 47.

Such an unloading blood pump 40 allows continuous operation with little wear and tear while having a blood flow rate of between 0.05 L/min and 0.5 L/min. Thus, in some cases depending on the formation of the patient's heart, a blood pump may be adapted to have a flow rate between 0.05 L/min and 0.3 L/min and thus be even smaller, for example comprising a casing with a diameter of 3 cm and an axial length of 1.5 cm and a body of the rotor turbine with a diameter of 15 millimetres and an axial length of 5 millimetres. The continuous flow rate of the pump is set according to the characteristics of the heart and the vacuum to be achieved.

FIG. 3 represents a second use of another example of an unloading blood pump system 4' according to the first embodiment.

This unloading blood pump system 4' is identical to the first example except that the suction cannula 41 and the discharge cannula 43 are made of a single material and surround the casing of the pump 40 and that the control and power supply device 8' is adapted to be intracorporeal and comprises an induction charger 82 for charging the battery 81. This control and power supply device 8' may be positioned in another body space such as for example in the chest wall, under a pectoralis major muscle or under a dorsalis major muscle. The second use is identical to the first use except that the suction cannula 41 passes through the left ventricle 11A and thus comprises its suction end 411 in this left ventricle to suck blood and discharge it into the left subclavian artery 30A.

The method for implanting the unloading blood pump system 4 comprises in the first use two embodiments. In the first embodiment, the method comprises a first step of clamping the left atrium 10A and then a step of anastomosing the suction end 411 of the suction cannula 41 to the left atrium 10A and then a step of removing the clamping, from the left atrium.

In the second embodiment of the first use, the method comprises a first step of inserting the suction end 411 of the suction cannula 41 into the left atrium 10A, endovascularly through first the internal jugular vein and then the right atrium, and then passing through the inter-atrial septum for insertion of the end of the suction cannula 411 into the left atrium 10A.

By the step of anastomosing a cannula into a part of the heart, it is meant the insertion of the end of the cannula into the part of the heart for the connection of this cannula with the volume of this part of the heart.

The method for implanting the unloading blood pump system 4 comprises in the second use a step of putting the left ventricle under ventricular fibrillation and then a step of anastomosing the suction end 411 of the suction cannula 41 directly into the left ventricle 11A.

In the step of putting the left ventricle under ventricular fibrillation, the contraction is stopped for a few seconds while the suction cannula is inserted. The step of putting the left ventricle under ventricular fibrillation may comprise a substep of placing stitches and a collar on the beating heart left ventricle before the contractions are stopped.

The method then comprises, in both uses, a step of degassing the unloading pump.

The method then comprises, in both uses, a step of ligating, for example by clipping the clip 430, the subclavian artery 30A to ligate between 85 and 100% of the artery depending on the calculated flow rate.

The method then comprises a clamping step in two zones of the subclavian artery 30A.

The method then comprises a step of anastomosing the reinjection cannula 43 by inserting its reflux end 433 between the two clamps and downstream of the clipping 430,
  a step of removing the clamping from the subclavian artery,
  a step of calculating the flow rate to be unloaded from the blood of a left atrium to avoid a HFpEF,
  a step of setting the control unit of the pump according to the calculated flow rate,
  a step of starting the pump by the control unit.

Unless otherwise specified, a same element appearing in different figures has a single reference.

The invention claimed is:

1. An unloading blood pump system for a treatment of heart failure with preserved ejection fraction (HFpEF), comprising:
  a suction cannula comprising a suction inlet configured to be adapted to be located at an atrium or ventricle and an outlet end,
  a flux reinjection cannula comprising an inlet end and a reflux end, wherein the reflux end is adapted to be located at an aorta or an artery downstream of the aorta,
  an unloading blood pump comprising:
    a pumping chamber body for pumping blood when activated,
    an inlet port connected to the outlet end of the suction cannula, for sucking blood from the suction cannula to the pumping chamber body, and
    an outlet port connected to the inlet end of the flux reinjection cannula for expelling blood from the pumping chamber body to a flux reinjection cannula,
    the unloading blood pump being configured to, depending on its power supply, allow a nominal constant continuous flow rate of between 0.05 L/min and 0.5 L/min to reduce a capillary pressure of a lung and/or of a left atrium and/or of a left ventricle,
  a ligation clip configured to ligate a subclavian artery upstream relative to the reflux end of the flux reinjection cannula,
  wherein the unloading blood pump comprises:
    a casing adapted to be incorporated into a human body,
    at least one stator secured to the casing, comprising winding coils,
    a rotor mounted centrally and rotatably movable relative to the stator,
    a turbine turned by the rotor,
    an electric power connector electrically connected to the winding coils,
    the pump chamber body being mounted in the casing housing the turbine,
    wherein the inlet port allows blood to be sucked from the suction cannula into the pump chamber body when the rotor rotates the turbine and the outlet port allows blood to be expelled from the pump chamber to the reinjection cannula.

2. The unloading blood pump system according to claim 1, wherein the blood pump wherein the rotor is configured to rotate at a continuous speed between 2000 and 5000 rpm for a flow rate of 0.05 L/min and 5000 rpm for a flow rate of 0.5 L/min.

3. The unloading blood pump system according to claim 1, wherein the pump is a centrifugal pump.

4. The unloading blood pump system according to claim 1, wherein the rotor forms a centrifugal pump rotor turbine housed in the pumping chamber body for pumping blood at a flow rate of between 0.05 L/min and 0.5 L/min.

5. The unloading blood pump system according to claim 4, wherein the blood pump comprises a maximum flow rate of 0.7 L/min.

6. The unloading blood pump system according to claim 5, wherein the reinjection cannula and the suction cannula comprise a diameter between 5 and 10 mm.

7. The unloading blood pump system according to claim 1, wherein the litigation clip extends from a part of the reinjection cannula close to the outlet port.

8. The unloading blood pump system according to claim 1, wherein the reflux end is configured be adapted to be located at a left subclavian artery.

9. The system of claim 1, further comprising a control unit operatively coupled to the unloading blood pump, the control unit being configured command the pump to maintain a nominal constant continuous flow within 0.05-0.5 L/min, such that the system is configured to treat heart failure with preserved ejection fraction (HFpEF) by reducing left-atrial and/or pulmonary capillary pressure when implanted and operated as configured.

10. A method for implanting an unloading blood pump system, the method comprising:
   either a first step of using a clamp at a location adapted to clamp a left atrium and then a step of anastomosing a suction end of a suction cannula such that the suction end is adapted to be located directly at the location of the left atrium and then a step of removing the clamp from the left atrium, or a step of putting an external electrical stimulator at a location adapted to put a left ventricle under ventricular fibrillation and then a step of anastomosing the suction end of the suction cannula such that the suction end is adapted to be located directly at the location of into a tip of the left ventricle under ventricular fibrillation,
   a step of degassing the unloading blood pump system,
   a step of ligating using a ligation clip at a location adapted to, clip, a subclavian artery to ligate between 85 and 100% of the artery,
   a clamping step using two clamps at a location adapted to clamp in two zones of the subclavian artery,
   a step of anastomosing a reinjection cannula by inserting its reflux end such that it is adapted to be located between the two clamps and downstream of the clipping,
   a step of removing the clamp from the subclavian artery,
   a step of calculating a flow rate to be unloaded from blood of a left atrium to avoid a heart failure with preserved ejection fraction (HFpEF),
   a step of setting a control unit of the pump according to the calculated flow rate, and
   a step of starting the pump by the control unit.

11. A method for implanting an unloading blood pump system, the method comprising:
   a step of inserting a suction end of a suction cannula such that the suction end is adapted to be located at left atrium, by inserting a suction cannula endovascularly through a location adapted to be at a first internal jugular vein, then a location adapted to be at a right atrium, and finally through a location adapted to be at an inter-atrial septum into the left atrium,
   a step of degassing the unloading pump,
   a step of ligating, using a ligation clip at a location adapted to clip, a subclavian artery to ligate between 85 and 100% of the artery,
   a clamping step using two clamps at a location adapted to clamp in two zones of the subclavian artery,
   a step of anastomosing a reinjection cannula by inserting its reflux end such that it is adapted to be located between the two clamps and downstream of the clipping,
   a step of removing the clamp from the subclavian artery,
   a step of calculating a flow rate to be unloaded from the blood of a left atrium to avoid a heart failure with preserved ejection fraction (HFpEF),
   a step of setting a control unit of the pump according to the calculated flow rate,
   a step of starting the pump by the control unit.

* * * * *